United States Patent
Tough

(10) Patent No.: US 11,268,645 B2
(45) Date of Patent: Mar. 8, 2022

(54) MATERIAL FOR USE IN LINING PIPES

(71) Applicant: Scott & Fyfe Limited, Tayport Fife (GB)

(72) Inventor: David Peter Tough, Tayport Fife (GB)

(73) Assignee: Scott & Fyfe Limited, Tayport Fife (GB)

( * ) Notice: Subject to any disclaimer, the term of this patent is extended or adjusted under 35 U.S.C. 154(b) by 214 days.

(21) Appl. No.: 15/308,589

(22) PCT Filed: May 1, 2015

(86) PCT No.: PCT/GB2015/051283
§ 371 (c)(1),
(2) Date: Nov. 2, 2016

(87) PCT Pub. No.: WO2015/166268
PCT Pub. Date: Nov. 5, 2015

(65) Prior Publication Data
US 2017/0114939 A1    Apr. 27, 2017

(30) Foreign Application Priority Data
May 2, 2014 (GB) .................................... 1407771

(51) Int. Cl.
*F16L 55/16* (2006.01)
*F16L 55/165* (2006.01)
(Continued)

(52) U.S. Cl.
CPC ........ *F16L 55/1656* (2013.01); *D04B 21/205* (2013.01); *F16L 11/02* (2013.01);
(Continued)

(58) Field of Classification Search
CPC .............................. F16L 55/1656; F16L 11/02
(Continued)

(56) References Cited

U.S. PATENT DOCUMENTS 4,025,684 A * 5/1977 Neidhardt ............ A47C 27/081
442/206
4,576,205 A * 3/1986 Morinaga ........... F16L 55/1656
138/124
(Continued)

FOREIGN PATENT DOCUMENTS

EP    1271031 A1    1/2003
GB    2156240 A    10/1985
(Continued)

OTHER PUBLICATIONS

International Search Report of PCT/GB2015/051283 dated Jul. 17, 2015.
(Continued)

*Primary Examiner* — James F Hook
(74) *Attorney, Agent, or Firm* — Sandberg Phoenix & von Gontard, P.C.

(57) ABSTRACT

A material for use in lining pipes is disclosed. A warp-knitted tubular fabric (24, 64) in which the stitch used (for example a tricot stitch) is of a type that reconfigures as the tube is expanded radially to contract longitudinally is sufficiently flexible and compressible to enable it to conform to pipe structures. The fabric of this invention is infused with resin, which is cured once the liner is in place within the pipe. Potentially, this fabric may be thinner than known prior art materials, but exhibits comparable strength and conformability, which are necessary characteristics in the repair or rehabilitation of pipes. The use of a thinner fabric material reduces constriction of the pipe bore by repair and also offers the potential for cheaper lining material, as less resin is required. The fabric may be knitted from glass fibre yarn, which is non-toxic and a stronger material than generally used in the prior art.

15 Claims, 6 Drawing Sheets

(51) Int. Cl.
  *D04B 21/20* (2006.01)
  *F16L 11/02* (2006.01)

(52) U.S. Cl.
  CPC ............... *D10B 2403/0112* (2013.01); *D10B 2403/02421* (2013.01); *D10B 2505/02* (2013.01)

(58) Field of Classification Search
  USPC .................. 138/97, 98; 405/150.1, 184.2
  See application file for complete search history.

(56) References Cited

U.S. PATENT DOCUMENTS

| | | | |
|---|---|---|---|
| 4,781,039 A | 11/1988 | Ribarev et al. | |
| 5,262,230 A * | 11/1993 | Becker | B29C 70/24 264/257 |
| 5,273,080 A * | 12/1993 | Morohashi | D03D 11/00 139/388 |
| 5,334,429 A * | 8/1994 | Imoto | B29C 63/34 138/128 |
| 5,501,248 A * | 3/1996 | Kiest, Jr. | D04B 1/02 138/123 |
| 5,535,786 A | 7/1996 | Makela et al. | |
| 6,042,668 A * | 3/2000 | Kamiyama | B29C 53/48 156/93 |
| RE36,859 E | 9/2000 | Storah | B29C 49/26 138/97 |
| 6,129,119 A * | 10/2000 | Schwert | B29C 47/0023 138/97 |
| 6,146,491 A * | 11/2000 | Wood | F16L 55/1651 138/97 |
| 6,170,531 B1 * | 1/2001 | Jung | E03F 3/06 138/97 |
| 6,935,376 B1 * | 8/2005 | Taylor | B29C 63/34 138/104 |
| 2002/0162364 A1 * | 11/2002 | Relats | F16L 57/00 66/170 |
| 2003/0217777 A1 * | 11/2003 | Williamson | F16L 55/1656 138/98 |
| 2005/0161100 A1 * | 7/2005 | Pleydon | B32B 7/12 138/98 |
| 2007/0131302 A1 * | 6/2007 | Relats | F16L 11/02 139/83 |
| 2008/0277013 A1 | 11/2008 | Anders et al. | |
| 2010/0154187 A1 * | 6/2010 | Kamiyama | F16L 55/1651 29/402.16 |
| 2010/0243091 A1 * | 9/2010 | D'Hulster | F16L 55/1651 138/97 |
| 2011/0083765 A1 * | 4/2011 | Stark | F16L 55/162 138/97 |
| 2012/0312407 A1 * | 12/2012 | Muhlin | F16L 55/179 138/98 |
| 2012/0328810 A1 | 12/2012 | Relats Casas et al. | |
| 2013/0081732 A1 * | 4/2013 | Kiest, Jr. | F16L 55/1651 138/98 |
| 2013/0092276 A1 * | 4/2013 | Caneva | D04B 21/205 138/123 |
| 2014/0220277 A1 * | 8/2014 | Lewis | F16L 59/021 428/36.4 |
| 2014/0261972 A1 * | 9/2014 | Colasanto | B32B 5/022 156/94 |
| 2014/0356074 A1 * | 12/2014 | Bureau | D03D 3/02 405/184.2 |
| 2015/0338014 A1 * | 11/2015 | Bichler | F16L 55/1651 138/98 |
| 2017/0029989 A1 * | 2/2017 | Tuscia | B32B 27/32 |
| 2019/0277438 A1 * | 9/2019 | Tough | B29C 63/26 |

FOREIGN PATENT DOCUMENTS

| | | |
|---|---|---|
| GB | 2312002 A | 10/1997 |
| GB | 2471579 A | 1/2011 |
| WO | 9831964 | 7/1998 |
| WO | 2009010599 A1 | 1/2009 |
| WO | 2011036266 A1 | 3/2011 |

OTHER PUBLICATIONS

Written Opinion of PCT/GB2015/051283 dated Jul. 17, 2015.
Intellectual Property Office Search Report for Application No. GB 1407771.3, dated May 11, 2015.

* cited by examiner

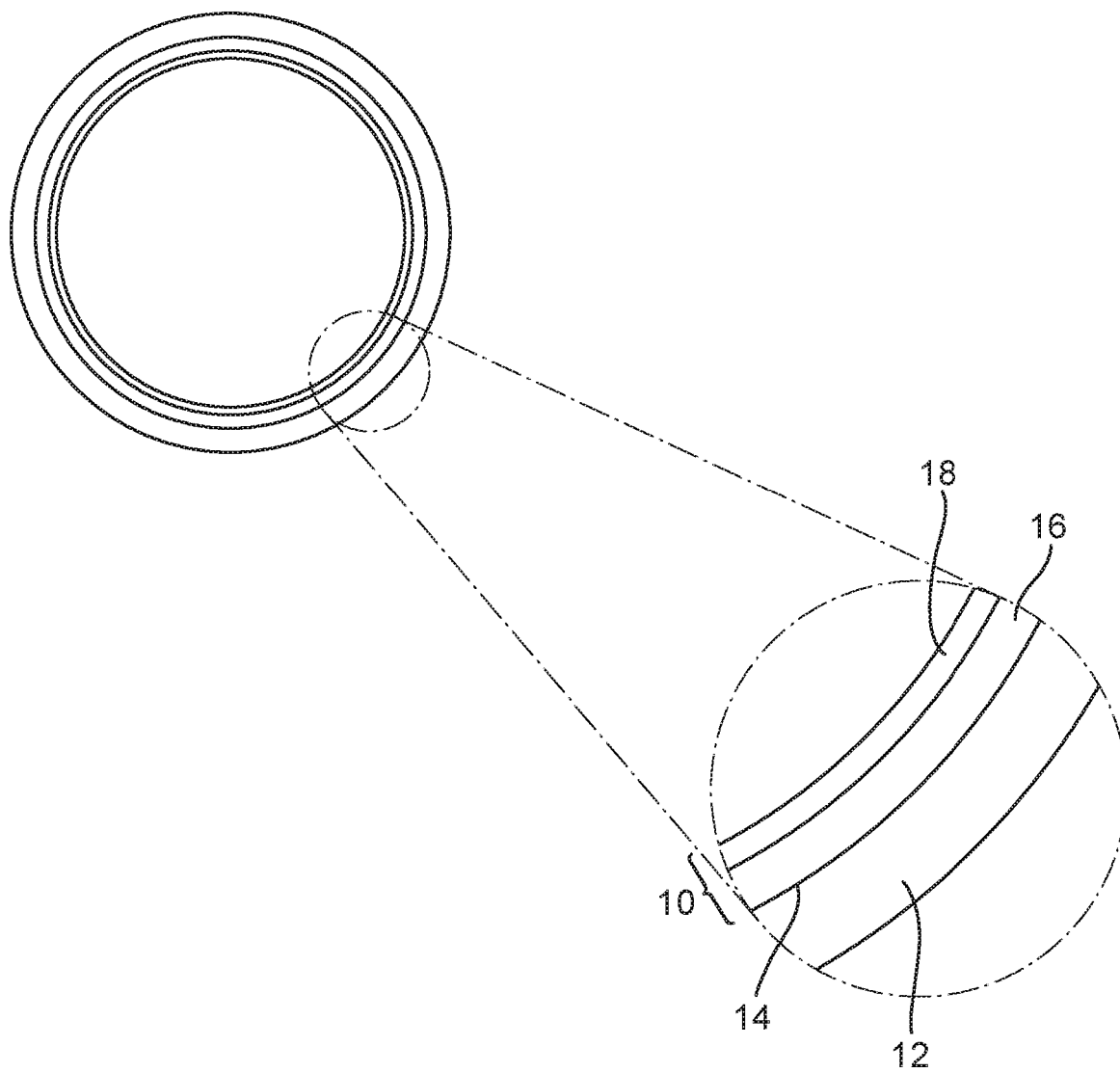

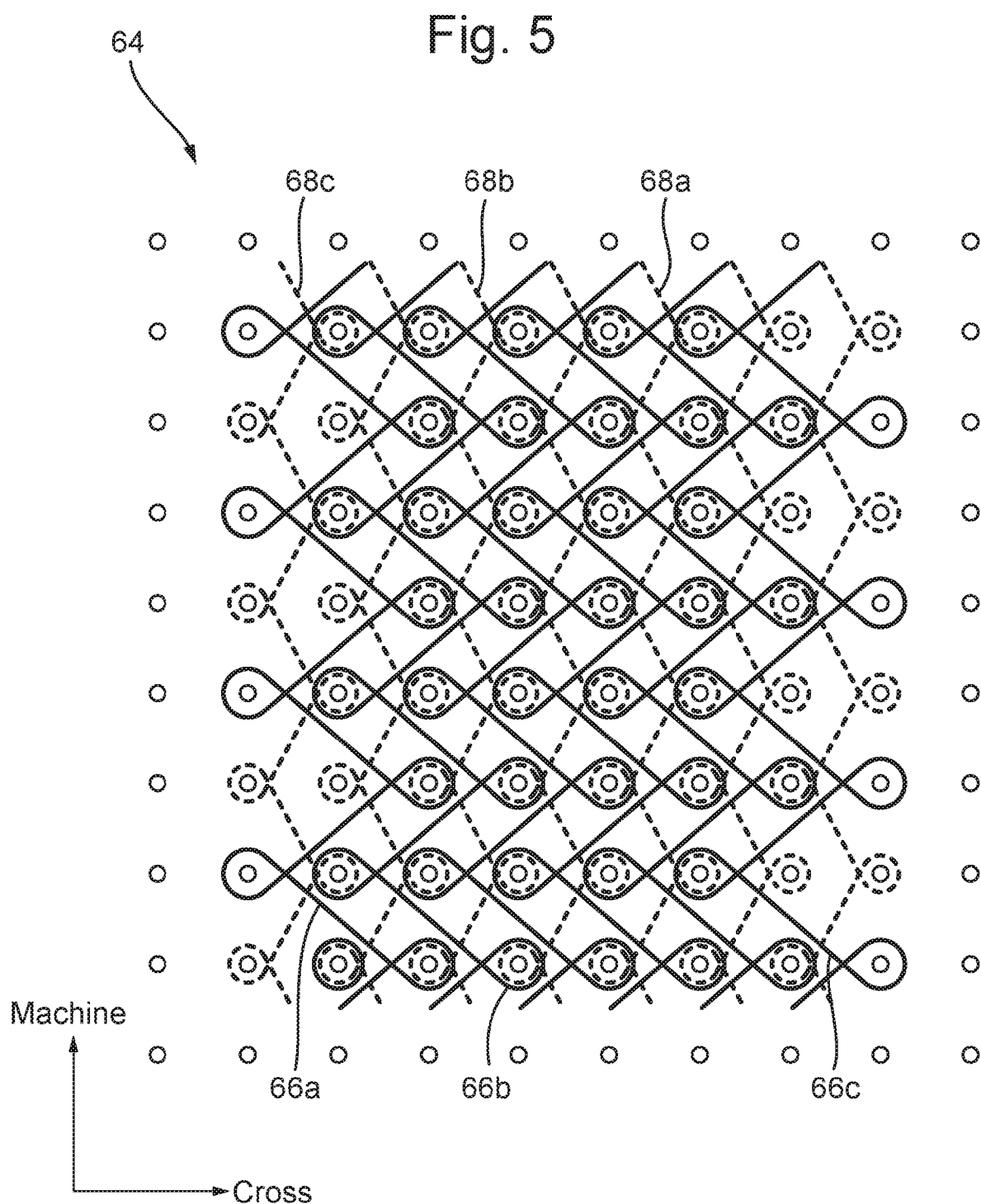

MATERIAL FOR USE IN LINING PIPES

CROSS-REFERENCE TO RELATED APPLICATIONS

This application is a U.S. National Stage under 35 U.S.C. § 371 of International Application No. PCT/GB2015/051283, filed May 1, 2015, which claims priority to GB 1407771.3 filed May 2, 2014, the disclosures of which are incorporated herein by reference.

BACKGROUND

This invention relates to flexible tubular lining material, in particular to a material that is used in the repair or rehabilitation of pipes, conduits and the like. Such a material is expected to find particular application to the rehabilitation of domestic and industrial water pipes, sewage pipes, steam pipes and also offshore pipelines such as found in the oil and gas industry.

The network of pipes in the modern environment is extensive. Mains pipes carry large volumes of water to a neighbourhood; other pipes lead from the mains to, for example, a street and from there smaller pipes divide out and convey fresh water for use in individual buildings and houses. Drainage pipes carry in reverse: from within buildings they take domestic waste to underground drains and thereafter to the public sewers.

It is invariably the case that a pipeline leak is problematic. It allows not only the leak of material out of the pipe (exfiltration) but also, in the case of underground or underwater pipes, the flow of substances into the pipe (infiltration). Both are undesirable. Sewage pipes may, for example, leak harmful waste products into the soil. A freshwater pipe on the other hand must remain watertight to prevent contamination of the water supply from the environment in which the pipe is laid. Leaks from domestic pipes can cause damp, mould and noxious smells. A burst water main can severely disrupt activity in its locality.

A pipeline leak must therefore be repaired quickly. Generally though most pipes are hidden underground, under floors or within walls and so direct access to replace the pipe is difficult, time-consuming and greatly disruptive. For this reason, there is a preference to repair or rehabilitate pipes by non-invasive lining of the damaged part. The cure in place pipe (CIPP) methods employ specific liner textile materials that are formed to a tubular shape and impregnated with resin. An installation process then affixes the liner to the damaged pipe. There are a number of known installation processes, which can be broadly categorised into open-end and closed-end installations. In an open-end installation, a mechanism is used first to insert the liner into the pipeline. When in position, a calibration tube is then positioned inside the liner and inflated to press the liner against the pipe. In a closed-end installation a higher-pressure driving mechanism such as compressed air is used to force the liner along the pipe and simultaneously to press it against the pipe inner surface. Each installation process has its own advantages and disadvantages. Regardless of which is used however, the resin is then cured, the pressure released and any insertion devices or calibration tubes removed. The cured resin therefore forms a hardened structure that is reinforced with textile material, which is fixed in position to reseal the pipe.

Repair in this manner is however complicated and fabricating liner materials to the necessary performance standard presents its own challenges. For example, many liner materials are limited in their ability to maintain integrity around bends and/or to cope with junctions between different diameter pipes. A typical pipeline network includes many bends, often of up to 90°, and numerous junctions. Not only are these more difficult to repair, but they tend also to be sources of pipe weakness, rendering them more prone to leaks in the first place. Pipe material is generally weakened as it is formed into a bend and junctions or couplings must be correctly fitted to avoid leakage at the outset, in addition to being susceptible to damage through use. Many liner materials lack the flexibility to line around bends: they tend to wrinkle severely at the inside bend, which disrupts flow, and to detach from the pipe wall at the outside bend.

A liner material that is capable of rehabilitating pipes that have a complicated structure is described in U.S. Pat. No. 6,170,531. The complicated structure means that the pipe network will have bends of up to 90°, changes in internal diameter and branched connections, all of which challenge materials to line effectively. The liner material described in this patent comprises a plush textile tube impregnated with resin and a surrounding foil tube. On insertion into a pipe, the tube structure is inverted. This results in the fabric and resin being positioned adjacent the inner surface of the pipe, the foil lining the inner surface of the fabric. Compressed air is forced into the pipe to press the liner against the pipe surface. The resin is cured to form a composite material that bonds to the pipe. The strength of the composite allows the repaired pipe to be used as before.

The foil lining is used for a number of reasons in this and other prior art liners. First, it acts to contain the uncured resin, particularly during an inversion installation process. Secondly, it forms a pressure-tight layer that aids liner insertion into the pipe. Once the liner is fixed in place though, the utility of the foil is limited. It is not necessary however to remove the foil layer and so it is generally left attached. It some situations it may act as a barrier layer to protect the composite material from whatever substance is carried by the pipe.

The plush textile itself is a circular-knitted fabric in which loops of yarn protrude from the core of the structure. It is this that confers the desired attributes of flexibility, compressibility and conformity to the liner. Overall compressibility of the structure is largely determined by the arrangement of relatively weakly compressible core and easily compressible loops. The material also exhibits both axial and radial (biaxial) flexibility. The compressibility should be sufficient to prevent creasing as the liner conforms to the inside of a bend. Biaxial flexibility is important for lining the outside of a bend and at pipe positions at which the diameter changes. Textile characteristics can be adjusted by selection of knit parameters and yarn material.

Although this liner material is better able to negotiate bends than other prior art materials, it still suffers from some drawbacks.

First it is limited in the size of pipes it can be used to repair. Acceptable performance is restricted to pipes of between around 50 and 250 mm diameter. The looped structure of the material makes it too thick for smaller-diameter pipes: the lining material presents an unacceptable constriction. This working range makes the prior art material eminently suitable for use in the rehabilitation of drains and sewers, but severely limits the opportunity to expand into other markets. For example, pipelines in the oil and gas industry have a more extensive range of standard pipe sizes, from 18 mm up to 1.5 m, for gathering, transporting and distributing oil and gas. In the off-shore industry, pipes transport not only oil and gas but also ancillary services associated with its extraction and for crew maintenance.

Pipes are therefore used to transport a whole range of products such as sewage, water for both human consumption and sprinkler systems, steam and slurry. Regardless of its function, an off-shore pipe is likely to be even less accessible than a drain running under streets and houses. Content too poses a hazard in this environment. The prior art material for a liner textile is most commonly polyester, which is flammable and emits toxic gases such as carbon monoxide and low molecular weight organic compounds on combustion. It must therefore be further treated or used with care if there is a risk of burning. There is however a need to be able to repair any leaks in off-shore pipelines in situ. This need is not being met satisfactorily by the current state of the art.

A second disadvantage of the prior art material is that it is limited in its ability to repair pipes that transport fluids under pressure. Whilst the prior art product described in U.S. Pat. No. 6,170,531 is used extensively in low pressure systems (up to 2 bar), it is unsuitable for use in higher pressure systems. Most rising mains convey water at an average 12 bar pressure, although this standard is set nationally and so varies from country to country.

Pipes and liners located underneath a road will experience repeated compression as cars and lorries pass along the road. Their structural integrity is weakened under compression, and the ability of lining materials to tolerate such wear is another performance aspect that may be improved.

During installation, the liner material will be subject to pressure, not only when directly pressed against the pipe surface but also by the insertion procedure, which may be driven by compressed air. Accordingly, the fabric tubes will lengthen during the installation process. This factor is particularly significant in a closed end installation. The liner is driven into the pipe from an upstream access point. Once it is fixed in position, access from a downstream point is necessary to cut the closed end of the liner. In a closed end installation, a miscalculation in the length of the liner may result in the liner falling short of the downstream access point. In this position it is impossible to cut the liner, which would therefore block the pipe. Prediction of the liner extension is therefore critical to this process. The extension of a plush fabric however is highly dependent on installation pressure, which makes its behaviour in a practical situation extremely difficult to predict.

Finally, the material used in the liner is relatively expensive, making the repair itself a costly enterprise, typically in the region of £50 to £70 per metre. A significant proportion of this arises through the cost of the resin (£10-£15 per metre). A composite material is however essential. The fibre-reinforced resin effectively replaces the section of pipe it rehabilitates. In addition to its role in binding the liner to the pipe, the resin forms a major component of the composite material. The properties of the cured resin, as well of those of the reinforcing fibre, are therefore critical to the performance of the liner itself.

There is therefore a perceived need for a flexible tubular material that can be used in the rehabilitation of pipes that is more versatile in its application to a range of pipe diameters and configurations. It is also desirable that the material can be adapted to be used to line pipes with less regard to the goods being transported within. It is accordingly an object of the present invention to provide a novel design of pipe lining material that is highly flexible in its design parameters and that is therefore capable of overcoming at least some of the aforementioned disadvantages.

According to a first aspect of the invention, there is provided a material for use in lining pipes, the material comprising a warp-knitted fabric in the form of a tube, the tube's longitudinal axis being aligned with the fabric's machine direction, and a film coating covering a surface of the tube wherein the fabric is knitted with a stitch that reconfigures as the tube is expanded radially to contract longitudinally.

The material of this invention is a precursor material to the pipe liner. In order to line the pipe, the material must be infused with resin, inserted in the pipe, pressurised and cured, as described above and as known in the art.

The prior art liner described in U.S. Pat. No. 6,170,531 is based on a weft-knitted fabric and, for this reason, is of more limited application than that of the present invention. A warp-knitted fabric, which is knitted so as to contract longitudinally as the tube is expanded radially, is flexible and compressible without the need to resort to the looped structure of the prior art plush material. The warp-knitted fabric is accordingly thinner. This has many advantages both in installation processing and application. In particular, a thinner construction can be used to line smaller diameter pipes, without undue bore constriction. A thinner liner may offer the option of carrying out repeated repairs on the same pipe section. Moreover, the thinness of the textile does not restrict its application to larger diameter pipes. The required liner thickness can simply be built up by using multiple layers, and to some extent by using higher tex yarns.

This capability to tune the thickness of the textile material to the required application also means that more economical use is made of the resin during infusion. There should be no need to infuse a textile of unnecessary thickness. It is also thought that penetration of resin is assisted by the more open construction of the warp-knitted fabric. This is in contrast to the core of prior art plush or felt fabrics, which accordingly are more difficult to impregnate fully.

The warp-knitted tubular fabric of this invention reconfigures by expanding diametrically whilst reducing in length. This cooperative movement helps to maintain liner wall thickness as the fabric is manipulated during fabrication and installation, which in turn leads to a more even distribution of resin. Moreover, in lining a pipe section that steps between different diameter pipes, the reconfiguring of the warp-knitted structure means that generally liner density is maintained. The prior art fabric tends to get thinner and lighter in the larger-diameter section.

The performance characteristics of the warp-knitted liner can be tuned by adjusting knit parameters. For example, the magnitude of the radial expansion depends on stitch length. Preferably, the knit is a tricot knit. In this case, the magnitude of radial expansion can also be adjusted by changing the number of needles that the tricot stitch skips. For example, a 1-needle tricot will exhibit increased expansion in comparison to a 2-needle tricot.

The tubular structure is preferentially achieved using a double needle bed knitting machine, each bed producing a 2 bar tricot knit in opposition, the two knitted halves being knitted together by pattern bars. In one preferred embodiment, each bar knits a 2-needle tricot pattern. In another, the first bar only produces the 2-needle tricot, the other knitting a 1-needle tricot. Alternatively, a circular warp knitting machine may be used.

In most embodiments, the material includes a film coating covering a surface of the tube. As noted in relation to the prior art, the film layer provides assistance to the processing of the fabric into a functioning pipe liner in many ways. In inversion method installations, in which the film covers the liner at all stages prior to installation, it contains the resin during infusion and assists in handling and manipulation of the fabric. It is also necessary in closed-end installations.

The film may be bonded to the tubular fabric in a number of ways. For example, it may be intermittently bonded, or bonded over its full surface. It may be powder bonded or adhered using a higher-bonding-temperature layer between the fabric and a lower-bonding-temperature layer.

Another advantage is found to be in the way the warp-knitted liner, in particular the tricot-knit embodiment, reconfigures at the stitch level to negotiate bends. The reconfiguration of the stitches under tension is complemented by an asymmetric reconfiguration, which assists in enabling differential expansion of the fabric. This is seen as a skewing of rib lines as the tubular fabric negotiates a bend, which is believed to contribute to the improved performance of a liner incorporating this fabric material in comparison with the prior art. Such a liner has been observed to crease to the same extent or less as it is fitted to the inner pipe bend. A similar improvement has been noted in the degree of detachment at the outer bend.

It has been noted that in using a fabric in accordance with this invention, the creasing around a bend primarily arises from limitations in the film's flexibility, not that of the textile. It follows therefore that a liner made from a fabric in accordance with the present invention and without the film layer will exhibit a far superior bend performance than known in the prior art. Possible applications of this further-improved liner include steam pipes in central heating systems, which may be lined using a process in which a film layer is not required. An alternative approach is to use a removable film layer in an open-ended installation, the film being removed once the liner is in place.

Ideally, the textile of this invention is knitted using a glass fibre yarn. Use of glass confers many advantages over the prior art, which, at present, tends to be reliant on polyester fibres. Primarily, resin-glass fibre composites produce a stiffer and stronger product in both tension and compression than polyester. This arises through the higher elastic modulus of straight glass fibre in combination with the ability of the resin to support the bend at the top of each glass stitch, which represents a source of considerable weakness to an uncoated glass fibre. The strength of the glass fibres means that they will preferentially take any load placed on the composite. The improved strength allows the same performance to be achieved with a thinner textile layer, which clearly complements the advantages obtained in this respect by using the warp knit. Specifically, less resin is required during infusion; constriction of the pipe bore by repair is reduced, leaving the options for repeat repairs; etc.

In addition, installation of a liner into a pipe involves subjecting it to pressure, both as it is manoeuvred into position and as it is compressed against the pipe. The forces involved tend to stretch the prior art textile, making ultimate length uncertain. This effect is reduced in a fabric made using glass yarn and in accordance with the present invention. This reduces the effect that variations in installation pressure will have on the installed length of a liner based on this embodiment of fabric material. Length calculations are therefore more reliable, making such a liner particularly suitable for closed end installations.

A further advantage is that the increased tensile strength of the liner means that it has the potential to be used within pressurised systems. This opens up additional markets to possible application of this product: freshwater pipes, sprinkler systems, steam heating systems, etc. Another advantage of glass is that it is inert and does not generate toxic products on combustion. This makes it an ideal material for use in environments in which there is a heightened risk of fire, such as the off-shore industry, or for pipes carrying heated or flammable substances.

In another aspect, the present invention provides a liner that incorporates the tubular material as described above and a film coating bonded to its surface, the tubular material being infused in a curable resin. The resin may be selected from the group of: polyester, vinylester, epoxy and silica resins.

In a third aspect the present invention provides a method of preparing a liner material for installation, the method comprising the steps of:

(a) Warp-knitting a tube of fabric, the tube's longitudinal axis being aligned with the fabric's machine direction, wherein the fabric is knitted with a stitch that reconfigures as the tube is expanded radially to contract longitudinally;
(b) Flattening the tube;
(c) Tensioning the flattened tube longitudinally such that its length increases by an amount between 0 and 25% until the tube contracts to a required width;
(d) Wrapping the flattened tube with a thin layer of film; and
(e) Bonding the film to the tube.

The coated tube may then be infused with curable resin in preparation for insertion into a pipe.

DESCRIPTION OF THE DRAWINGS

The invention will now be described, by way of example only, and with reference to the accompanying drawings, in which:

FIG. 1 is an illustration of a liner made using a fabric in accordance with this invention as it sits within a pipe;

FIG. 3b is a diagram illustrating the liner material of this invention at one stage during the process shown in FIG. 3a;

FIG. 5 is a binding diagram illustrating a knitting stitching used for an alternative embodiment of the textile material of this invention.

DETAILED DESCRIPTION

Figure 2A:
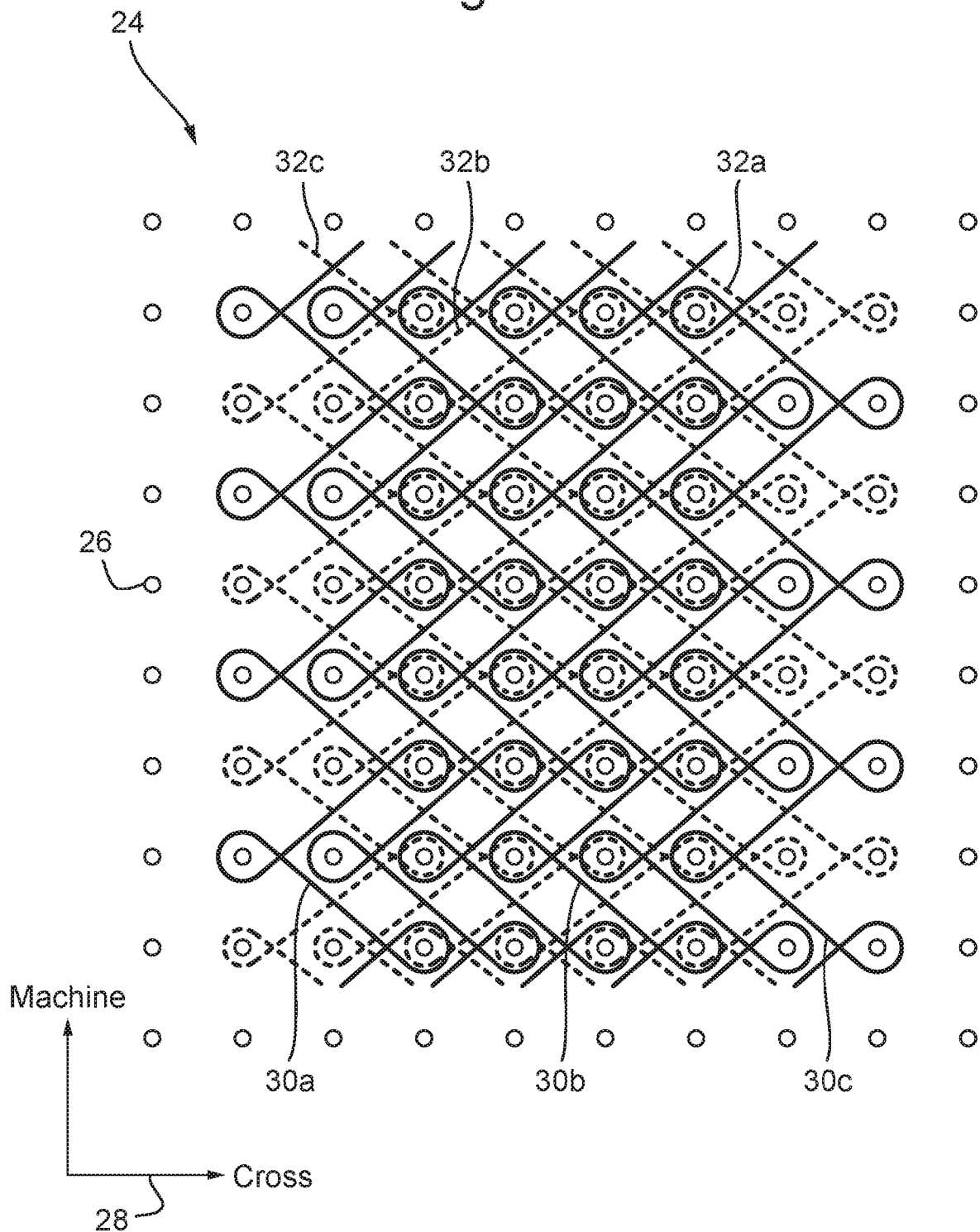
FIG. 2a is a binding diagram illustrating a knitting stitching used for a preferred embodiment of the textile material of this invention.

An example of a lining material constructed using a fabric in accordance with this invention is shown schematically in FIG. 1. The lining material 10 is shown within a pipe 12, adjacent an inner surface 14. The material 10 is a multilayered structure comprising an outer layer 16 of knitted fabric that is impregnated with resin. The resin is curable to a hardened structure that bonds the liner to the inner surface 14 of the pipe under repair. In this preferred embodiment the knitted fabric is glass. Inside the knitted glass layer 16 is an inner foil layer 18. The foil layer 18 in this embodiment is a film of thermoplastic polyurethane (TPU) or, preferably, an acrylic acid tetrabutyl ester (AAE) type film. Both materials have the characteristic that they are readily stretched, with AAE additionally being non-toxic. Other materials could alternatively be used for the film, depending on compatibility with the textile layer, application, availability and other factors.

The film coating 18 is bonded to the fabric layer 16 by a suitable process. The details of the process, as will be clear to one skilled in the art, will depend on the materials of both the film and the fabric. One example, suitable for adhering the TPU or AAE film to the glass fibre fabric of this embodiment, results in a two-layer film coating 18. A high-temperature process is used to attach the first film layer to the fabric, but the high temperature required to ensure adhesion tends to affect the impermeability of the film. A second layer is therefore bonded to the first layer, film—film adhesion occurring at a lower temperature, in order to ensure that it remains intact. It is envisaged however that a single layer of film will, in some circumstances, be attachable without, or with an acceptable degree of, degradation. In an alternative embodiment a multilayered TPU film, which has the property that the inner layer has a lower melting point than the outer layer, can be applied in a single stage. In a third alternative, a single layer of film is powder bonded to the fabric layer 16. It is clear therefore that the film can be single or multilayered, according to circumstances and bonding requirements.

The knitted fabric is the base layer, which gives the liner its flexibility. It is well known that the yarns in a knitted material comprise a plurality of interlinked loops or stitches. Each loop is relatively loosely held in an open structure, which immediately provides material flexibility and accommodates expansion.

The particular knit used in this embodiment of the fabric layer of this invention is a 4 bar 2 needle tricot knit in opposition. In its simplest form, a tricot knit is a warp-knitted structure in which yarns follow wales along the length of the fabric, each loop of a stitch securing a loop of a stitch in an adjacent wale and from the previous row. In this way the yarn zigzags lengthwise along the length of the fabric. The result is a fabric which has fine lengthwise ribs on one side and crosswise ribs on the reverse. In the 2 needle tricot knit each stitch secures a loop of the previous row 2 wales across. The 2 needle tricot in opposition employs a second bar in the knitting machine to add a second fabric that intermingles with the first. In order to illustrate this, FIG. 2a is a binding diagram 24 showing the knit used in a preferred embodiment of this invention.

A binding diagram, as is well known in the knitting field, is a symbolic representation of the movements of the guide bars of a knitting machine as it creates the fabric. From this, a skilled operator can recreate the fabric with a suitably configured machine. Each dot 26 represents one needle head at one point in time. Each horizontal row of dots represents a series of needles during one stitch forming process. That is, one row or course of the fabric. The rows of dots from bottom to top represent a succession of stitch-forming processes. The vertical direction on the page thus corresponds with the machine direction and the horizontal axis with the cross direction, as shown by axes 28. As the machine knits a fabric, the guide bars first form the stitch itself by wrapping the yarn around the front of the needle (the overlap) and drawing it through the previously-formed stitch. They may then move the yarn laterally across the back of the needles to form the underlap. In the binding diagram, the path followed by the guide bars is drawn in front of and behind the needles.

The knitted fabric 16 of this invention is created using a double needle bed knitting machine, the two halves of fabric being knitted together during this process to form a tube. One half of the fabric, which, in accordance with this embodiment, is knitted on the first needle bed to a specific 2 bar 2 needle tricot knit, is represented in the form of a binding diagram in FIG. 2. A first bar of the knitting machine knits its yarns into a 2 needle tricot stitch 30a, 30b, 30c. A second bar also knits a 2 needle tricot stitch 32a, 32b, 32c, this being in opposition to the first tricot knit. That is, neighbouring needles have stitches formed by the needles drawing the yarn in opposite directions.

The second needle bed knits the second half on the fabric, the binding diagram for which will be a mirror image to that shown in FIG. 2a. Four pattern bars knit the edges of the two halves together, as the fabric is produced, to form the required tube shape.

In an alternative method, a circular warp-knitting machine may be used to fabricate the tubular tricot-knitted textile of this invention. Circular warp-knitting machines tend to be more limited in size than a double needle bed construction but they are capable of operating at high speeds. They are unlikely therefore be an option if the fabric is to line larger diameter pipes, but may be preferred for pipe sizes 70 mm or below.

Figure 2B:
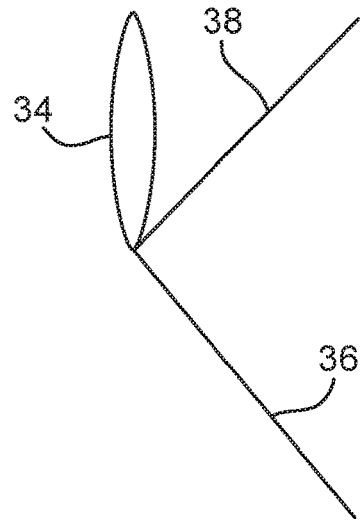
FIG. 2b is a schematic representation of a tricot knitted stitch.

Regardless of the mechanics of its fabrication, a tricot knitted tube has the property that when it is expanded, for example to press against a pipe, it will increase in diameter and at the same time decrease in length. This characteristic is imparted largely by the stitch configuration, which is shown in FIG. 2b. The stitch includes a looped portion 34, which, when relaxed, is oriented usually at a small angle to the machine direction. Incoming 36 and outgoing 38 yarn portions are oriented at larger angles to the machine direction and also to each other. These relative orientations of the yarn in a tricot knit and the ability of each part of the stitch to take yarn from another part allows the angles to be both tuned and adjusted. This is an important factor contributing to the flexibility and conformability of the material of this invention and also of a liner in which it is incorporated.

The tricot-knitted glass fibre material has been found to be at least as good as the plush fabric used to form composites for lining pipes in the prior art, and in many applications offers considerable improvement. It shows substantially similar conformability and expansivity, even at these early stages of development. Moreover, without the looped structure of the plush material, the knitted fabric is thinner and therefore has potential to line pipes of smaller diameters. Glass fibres have a particularly high elastic modulus when straight, which enables them to take up more load than the fibres of the prior art structures when the reinforced resin composite is stressed or compressed. This in turn allows thinner composite layers to perform to a similar standard.

As is well known in the art, knit parameters can be varied in numerous ways to tune the characteristics of a knitted fabric. For example stitch length can be changed, which in turn will affect the angle at which the looped portion is oriented to the machine direction. The number of needles stepped by the tricot stitch can be varied, which will affect the orientation of the yarn in the knitted stitch. In this preferred embodiment it is a 2 needle stitch, but a 1 needle tricot stitch has also been found to perform well, although with perhaps too much expansion for some applications. The number of bars used in the knitting machine to create the fabric can be increased to produce a denser fabric, if required, or, conversely, decreased. The gauge i.e. number of stitches per inch can be varied, again to adjust the density of fabric. Typically, the gauge and stitch length are symmetrical. That is, the fabric is likely to have, for example, 9 stitches per inch in the cross direction and 9 rows per inch in the machine direction.

Yarn material and weight can also be selected according to circumstances and required performance. For various reasons, glass fibre is a much preferred yarn material for use with this invention, but this is not to be seen as limiting. Glass fibres are particularly strong when used as reinforcement in a resin composite and so will preferentially take up any load placed on the liner material. This has a number of consequences to material performance, as described previously. There is no requirement for the two materials knitted together to be the same. One could be glass and the opposition knit another material such as aramid, nylon, polyester, polypropylene, rayon, cotton, basalt, metals, PEEK (polyester ester ketones) and dyneema. Alternatively, neither yarn need be glass and one or two alternative options may be selected from this list. The type of knit could also be adjusted, for example one bar could knit 1 needle tricot and the second a 2 needle tricot, as shown in FIG. 5. This creates a material with expansivity that is intermediate between the fully 2-needle and fully 1-needle versions. Nor is a tricot knit an essential requirement of this invention. For example fabrics comprising a 3 needle inlay and the heavier 4 needle inlay, both in conjunction with a chain stitch, have shown promise, but are not considered as effective as the 2 needle tricot in satisfying all requirements for pipe liners. Different knit patterns that can be used to create a tubular structure that exhibits the required characteristics of diameter increase and length contraction that are necessary for this application will be apparent to one skilled in the art.

Figure 3A:
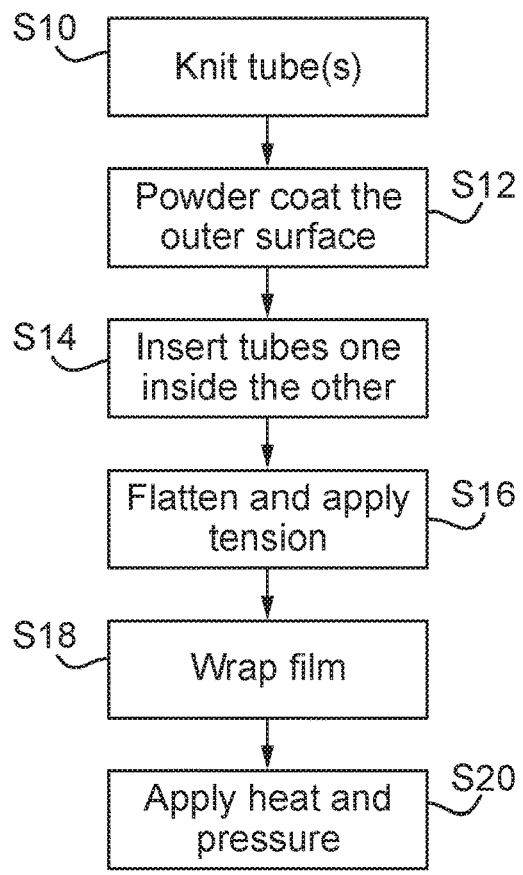
FIG. 3a is a flow chart setting out the process steps in constructing a liner material of the invention.

Once the tubular knitted fabric is removed from the knitting machine, it has to be processed further to be in a form suitable for lining a pipe. Particular processing methods will depend on the required application but a flow chart setting out the steps in a process particularly suited to constructing a liner from knitted glass is illustrated in FIG. 3a. This figure is to be considered in conjunction with FIG. 3b, which illustrates the liner towards the end of the process represented by FIG. 3a As a first step S10, one or more tubes 16a, 16b, 16c of glass fibre yarn are knitted on a double needle bed warp-knitting machine, as described previously. Each knitted tube has a thickness of around 1 mm and so, typically, 3 such tubes will be used to line a 100 mm diameter pipe. If however a single-layer structure has sufficient strength, then the benefits of reduced pipe constriction and the need for less resin will make this design preferable. The strength requirement however is likely to restrict application of the single-layer embodiment to the repair of pipes of diameter 50 mm or smaller. The remainder of the process set out in FIG. 3a will be described for an exemplary liner made from three tubes, although this can of course be varied in accordance with requirements. At the next stage S12, 20-30 g of powdered ethyl vinyl acetate (EVA) is coated on the outer surface of each tube 16a, 16b. The tubes 16a, 16b, 16c are then inserted S14 one inside the other to create a 3-layer tubular structure. At step S16, the tubular structure is flattened and tensioned longitudinally, such that its length increases by an amount in the range 0 to 25%, until it reaches the desired width. By stretching the tubular material 16 longitudinally, it is compressed radially, reducing the lay-flat width. This lengthens the looped part of the tricot stitch and aligns it more closely with the longitudinal direction, narrowing the gauge. This improves the capability of the fabric to accommodate any change in diameter at bends or otherwise, both by way of increasing the ability of the knitted structure to compress as it rounds the inside of a bend and increasing the degree of expansion available in a radial direction.

Figure 3B:
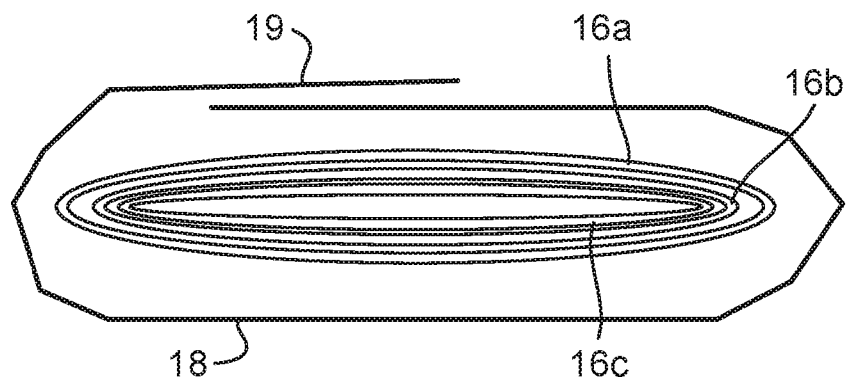

At step S18, a layer of TPU film 18 is wrapped around the tensioned 3-layer structure, with an overlap 19 of between 10 and 30 cm, depending on size of pipe to which the liner is to be fitted. This structure is illustrated in FIG. 3b. Finally S20, the structure is heated until it reaches a temperature of around 150° C. for 90 seconds, which is sufficient to set the EVA adhesive coating, whilst a pressure of around 0.5 bar is applied to ensure that the molten powder is evenly distributed through the textile and bonding occurs between all layers. The result is a 3-layer tubular structure of knitted glass fibre that is coated with a TPU film. Bonding the film fixes the stitches in their tensioned configuration. The liner is now ready for infusion with resin and installation into a pipe.

Note that the layer of film 18 tends not to contact the knitted structure 16 at the folded edges, to the left and right of FIG. 3b. This part therefore remains loose.

In use, the film layer 18 should accommodate pipe bends and diameter changes in a similar manner to the knitted material 16. To this extent, it should be elastic and have a Poisson's ratio as close to the ideal of 0.5 as possible. Practically though, film materials that are used as coatings for this application will have a Poisson's ratio in the range 0.2 to 0.3. The film must also bond to the material of the fabric. Beyond this, properties will depend on intended use. If the liner is to be used in water pipes, all components, including the film, must be non-toxic. If it is to be used in pipes carrying flammable materials such as gas and oil, it should be flame-retardant. Preferred materials are TPU and the non-toxic AAE-type films.

The production process described above employs powder bonding to adhere the layers to each other and the film to the fabric. This is not to be seen as limiting and, as known in the art, bonding between these components can be achieved in a variety of ways.

For example, steps S18 and S20 may be repeated and multiple film layers applied. In this embodiment, the film is not powder bonded to the textile layer. Instead an inner layer is used as an adhesive layer. As indicated previously, the impermeability of this bonding layer may be reduced as it is heated to promote bonding. If multiple film layers are applied, they may be bonded to each other by a different adhesive that has a lower bonding temperature.

In an alternative bonding process, the film may be attached at intermittent points over the surface of the textile tube. As has been noted previously, the ability of the knitted structure 16 to conform to a bend, with minimal creasing at the inside and without becoming significantly detached at the outside of the bend, is in advance of that of the film layer 18. Accordingly, use of an intermittent bonding pattern between textile and film should allow the film to fold independently of the knitted structure. This potentially means that, within a pipe, the film layer will fold without forcing the textile layer to follow. As the film layer is significantly thinner, the resultant creases within the bore of the pipe will be far smaller than those of the fully bonded liner.

Once coated with film, the liner 10 is fitted to a pipe by an inversion method, as is known in the prior art. Prior to fitting, the liner is supplied in the form of a sleeve, with the knitted fabric 16 on the inside and film 18 on the outside. The resin material is poured into the inside of the sleeve, which is then compressed to ensure an even distribution throughout the liner. The resin material itself can be any of a number currently used in the art, for example epoxy resins, polyester, vinylester and silica resins. The liner is turned inside out by the act of its insertion into a pipe, to leave the film 18 on the inside and the liner 16 on the outside (see FIG. 1). Once in position at the part needing repair, compressed air is blown into the liner both to force the liner material against the inside of the pipe and to cure the resin. This leaves the liner affixed to the pipe, effecting the repair.

Another advantage in the use of glass fibre material is that glass tends to link more effectively with the resin than alternative knitted materials. This enables a better bond to be formed. Moreover, as the glass fibre knitted material can be made thinner than the plush material used in the prior art, less resin in required to coat it and form the composite. As resin represents a significant proportion of the overall cost of the liner, this makes a liner in accordance with the present invention significantly cheaper than a comparable prior art liner.

A further advantage of the thinner liner is that it may even be used to repair the same section of pipe more than once. Each repair inevitably constricts the bore of the pipe, which in the prior art tends to restrict a particular pipe section to a single repair. This particularly affects junctions and smaller pipes. As a liner in accordance with this invention is around 66% of the thickness of prior art plush liners, it offers the potential to repair a pipe section two or more times, before the section has to be accessed and replaced.

Figure 4A:
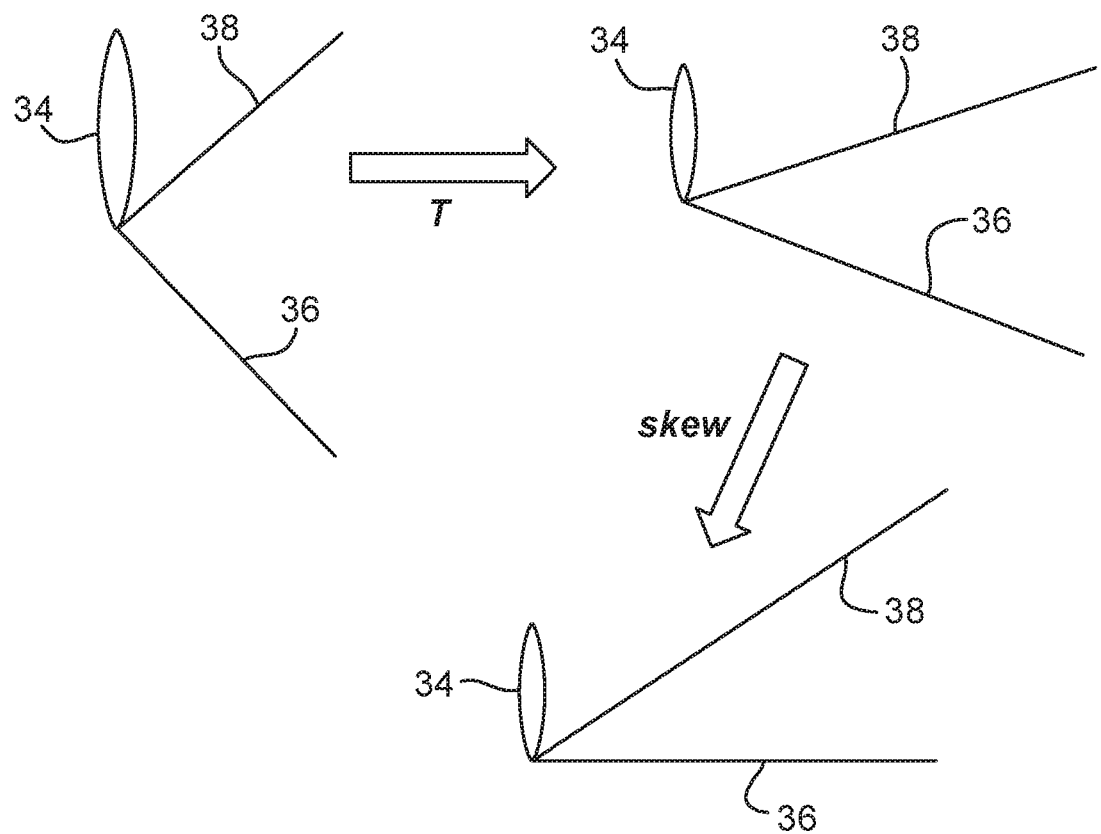
FIG. 4a is a schematic representation of the change in configuration of a tricot knitted stitch when a fabric is subject to radial tension and then skews.
Figure 4B:
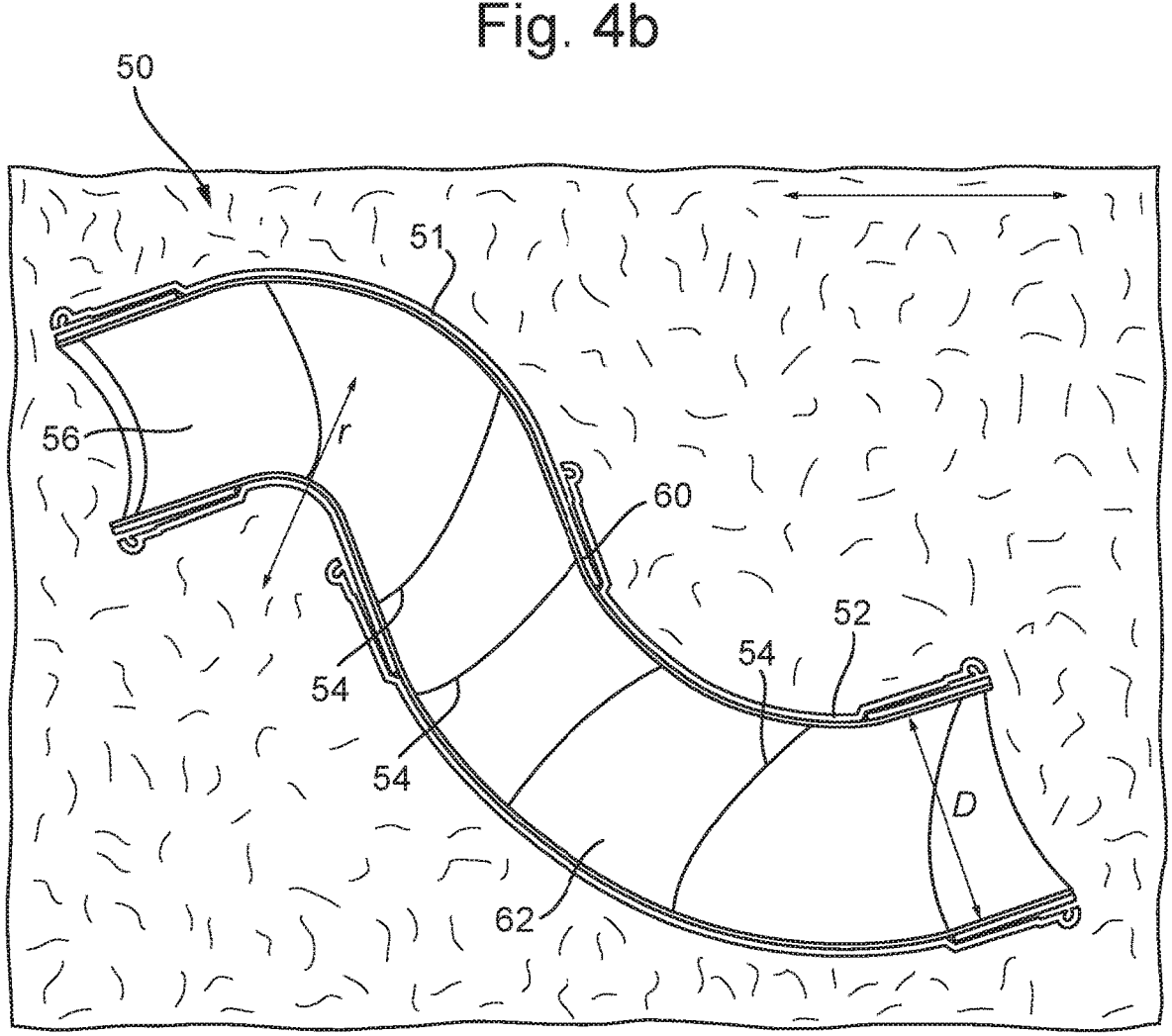
FIG. 4b is a photograph of a bend in a pipe lined with a liner that includes the fabric of this invention, the liner marked with lines that illustrate the way in which the knitted material skews in order to accommodate the bend.

As stated previously, a particular difficulty encountered in the prior art is to line bends within pipes and also to line junctions between pipes of different diameters. In order to illustrate how the knitted fabric of this invention accommodates pipe bends, FIG. 4a shows first how a tricot stitch deforms when the knitted tube of this invention is expanded radially and secondly how it further deforms when such an expansion is uneven, for example when accommodating a bend. FIG. 4b shows a photograph of a representative pipe bend that is lined by a liner incorporating a fabric in accordance with this invention.

With reference to FIG. 4a, the tricot stitch comprises the looped region 34 and two 36, 38 angled straight yarn portions. The loop is largely aligned with the machine direction and so when the tube is expanded radially, the stitch reconfigures such that the straight portions 36, 38 take in more yarn and so lengthen and align more closely with the cross direction. In consequence, less yarn makes up the looped region, which therefore contracts and aligns more closely with the machine direction. In addition, the yarn is placed under tension and stretches. Glass is a particularly effective material to use in reinforcing composite resins, which better resists the stretching caused by this tension. If the tension causes differential expansion of the fabric, then initially the individual stitches will reconfigure in this manner, with some looped regions 34 becoming shorter than others, as required. There is a limit though to stitch lengthening and shortening, set either by internal forces in the fabric or by an external influence, such as a film coating. In order to accommodate further differential expansion therefore the fabric and stitch will skew. That is, one straight stitch portion 38 will take in more yarn than the other 36. This ability to adopt an asymmetric reconfiguration is believed to be responsible for the improved performance of a fabric in accordance with this invention in accommodating pipe bends and connections between pipes of different diameter.

In the photograph of FIG. 4b is a pipe 50 of diameter D. Within the pipe 50 is a tight bend 51, which is referred to as an elbow bend. The elbow bend has a radius of curvature r, when measured to the central axis of the pipe. The tightness of the bend is indicated by the ratio r/D, with smaller values indicating a more severe bend. In a typical drainage network, bends can have an r/D ratio of up to 0.85. This is shown in the illustrated example, the radius being 85 mm and the pipe diameter 102 mm.

The pipe is lined by a lining material 52 in accordance with this invention. This liner was inserted into the pipe in a direction from a first straight region 56 of the pipe, through an elbow 51 to a second straight region 60. Thereafter, the pipe 50 bends in an opposite direction, although through a more relaxed bend 62, to a final straight region (not shown). Once the liner was fixed to the walls, the pipe was cut open to reveal the liner, as shown.

A tricot knitted pattern exhibits ribs of stitches running circumferentially across the surface of the tube. Selected ribs are highlighted in the photograph by lines 54, which can be seen to vary in appearance as the liner conforms to the different sections 56, 51, 60, 62 of the pipe.

Clearly, as the liner material curves round, those stitches close to the inside bend will need to compress to conform to the bend, whilst those to the outside will stretch. It is the ability of a material in accordance with this invention to handle both compression and extension that makes it particularly suited to this application. During installation, the liner in its relaxed state is inserted into the bend from the side of straight section 56 and expanded so that it is pressed against the inner surface of the pipe. It can be seen that the stitches reconfigure to deal with this expansion, but not in a linear way. The liner in the first straight region 56 expands radially in an essentially symmetrical manner, with the circumferential ribbing 54 maintaining its orientation with respect to the pipe. On the bend 51 however, the installation causes the ribbing 54 to become skewed. That is, expansion is not symmetrical about the bend axis. Stitches at the outside are lengthened, and those at the inside are relatively short, but liner itself expands further at this position on the bend. This can be seen in the photograph: lines 54 are longer at bend 51, indicating greater radial expansion across portions of the bend than on the first straight section 56. This increased expansion is maintained to the second straight section 60, in which the ribs 54 are no longer circumferential to the pipe. Nor do they adopt a circumferential alignment as a result of the reverse second bend 62. A short distance away from the bend 62 however, in the final straight section (not shown), the ribs do revert back to their original circumferential orientation. This ability of the liner to conform to a tight bend in a pipe is a result of reconfiguration of the stitches, which is evidenced as a skewing of ribbing 54 caused by differential expansion around the bend.

In comparison with the expanded liner fitted to the first straight section 56, the stitches on the outside bend 51 have increased gauge and stitch length; those on the inside have a smaller gauge and stitch length. Generally the inside-bend gauge and stitch length are smaller than the pre-expanded configuration of the liner, which requires the knitted material to absorb compression.

Differential expansion is of course also useful in lining a junction between two pipes of different diameters. A single section of liner in accordance with this invention can be of a diameter such that not only can it expand to line the smaller pipe, it can also expand to line the larger pipe. This requires a higher radial expansivity than known in the prior art. In particular, pipes used for pipeline transportation generally come in standard sizes to ensure interconnectivity, with connectors being available to enable one size of pipe to connect to the next size up or down. With standard sizes of 50, 70, 100, 150, 200 and 250 mm, fitting the 100 to 150 mm connector requires the greatest differential expansivity. Experiment has shown that this can be accommodated by the liner incorporating the fabric of this invention.

FIG. 5 is a binding diagram 64 showing an alternative knit that may be used to form the fabric of this invention. This diagram shows one half of the fabric knitted on 2 bars of the machine. A first bar knits its yarns into a 2 needle tricot stitch 66a, 66b, 66c. A second bar knits a 1 needle tricot stitch 68a, 68b, 68c. It is noted that, as for the FIG. 2a pattern, neighbouring needles have stitches formed by the needles drawing the yarn in opposite directions.

Comparing the 1-needle tricot stitch 68, with the 2-needle stitch 66, it is apparent that the straight yarn portions 36, 38 (see FIG. 4a) of the stitch subtend a larger angle. In the relaxed state therefore, these yarns extend a shorter distance in the cross direction. Under radial expansion however, the angle subtended is reduced and the relative increase in length as these yarns align with the cross direction is greater. Accordingly, the 1-needle knit exhibits greater expansivity. Use of a 2-needle tricot combined with a 1-needle tricot means that the radial expansivity of the fabric is increased relative to that of the embodiment shown in FIG. 2a, but not by so much that expansion is excessive for many applications.

This invention, in particular the preferred embodiment that incorporates glass fibre yarn in the knitted material, opens up potential new markets to the CIPP rehabilitation of pipeline sections. The current most popular CIPP application is to the repair of drainage systems. Severe safety restrictions are placed on materials for use in pipelines carrying drinking water and CIPP is not currently a widely-used technique for rehabilitation in this environment. Neither glass nor AAE is a toxic substance and accordingly this present invention may potentially be used to repair drinking water pipes. In another potential application to pipes carrying drinking water, a glass/AAE liner in accordance with this invention may be used not to repair but to line water pipes in which the pipe material itself may represent a contamination hazard. In particular, in the UK at least, a significant proportion of pipes that carry water from the street main to individual houses are still lead pipes and internal lining is required to alleviate health concerns. Of course, when used as a lining material, the strength of the product is of reduced importance and so a single-layer fabric may advantageously be used with a greater range of pipe sizes. Another field in which the prior art liner has limited application is the off-shore oil and gas industry. In-field pipelines can carry a variety of products, each potentially with its own hazards. Not least is the fact that oil and gas are flammable and so there is a need for a flame-retardant liner material, which is satisfied by glass. In addition, the hazardous conditions require the use of more specialised, and accordingly more expensive, resins. The fact that the present invention offers the possibility of using a thinner liner means that less resin is needed, which therefore makes this invention still more advantageous.

In the off-shore industry, the film itself may not be required. It is a useful component of the installation process, providing support to the knitted fabric as it is coated in resin and compressed. Once the liner is in place, glass is resistant to the corrosive effects of the pipeline products, whereas the film material is not. However, the resin-cured knitted fabric is sufficient to repair the pipe and loss of the film coating is immaterial. In fact, the film could be made of a material that is removed after installation and before the pipeline is put back into use. Or the film potentially could be dispensed with altogether.

The invention claimed is:

1. A liner for use in pipe rehabilitation, the liner comprising:
   a tubular material that comprises a warp-knitted fabric in the form of a tube, the tube's longitudinal axis being aligned with the fabric's machine direction;
   the fabric being knitted with a stitch that reconfigures as the liner is expanded radially to contract longitudinally; and
   the tubular material is at least partially flattened and pre-stretched in a longitudinal direction such that its length increases and its width decreases; wherein the liner also comprises:
   a film coating bonded to a surface of the tubular material, bonding with the film coating holding the tubular material in its tensioned configuration; and
   the tubular material is infused in a curable resin.

2. A liner according to claim 1 wherein the fabric is a tricot knitted fabric.

3. A liner according to claim 2 wherein the material is knitted from a glass fibre yarn.

4. A liner according to claim 1 wherein the tubular fabric is knitted using a double needle bed knitting machine, each bed producing a 2 bar tricot knit in opposition.

5. A liner according to claim 4 wherein each bar knits a 2-needle tricot pattern.

6. A liner according to claim 4 wherein one bar of each bed knits a 2-needle tricot pattern and the other bar knits a 1-needle tricot pattern.

7. A liner according to claim 1 wherein the material comprises at least two tubes of warp-knitted fabric, the tubes being placed one inside the other and bonded together.

8. A liner according to claim 7 wherein the at least two tubes are held together by powder bonding.

9. A liner according to claim 1 wherein the coating is intermittently bonded to the knitted fabric.

10. A liner according to claim 1 wherein the coating is powder bonded to the knitted fabric.

11. A liner according to claim 1 wherein the coating comprises a first layer with higher bonding temperature that is adhered to the tubular material and a second layer with lower bonding temperature that is adhered to the first layer.

12. A liner according to claim 1 wherein the resin is selected from the group of: polyester, vinylester, epoxy and silica resins.

13. A method of preparing a liner material for installation, the method comprising the steps of:
   (a) Warp-knitting a tube of fabric, the tube's longitudinal axis being aligned with the fabric's machine direction, wherein the fabric is knitted with a stitch that reconfigures as the tube is expanded radially to contract longitudinally;
   (b) Flattening the tube;
   (c) Tensioning the flattened tube longitudinally such that its length increases by an amount between 0 and 25% until the tube contracts to a required width;
   (d) Wrapping the flattened tube with a thin layer of film;
   (e) Bonding the film to the tube; and
   (f) Infusing the tube in a curable resin.

14. A method according to claim 13 wherein Step (a) above includes warp-knitting at least two tubes of fabric and placing the at least two tubes one inside the other.

15. A method according to claim 14 wherein the method includes the additional step of coating an outer surface of each tube with a powder-adhesive before placing one inside the other and Step (e) includes heating the structure to a temperature sufficient to bond the adhesive.

* * * * *